(12) United States Patent
Larson (10) Patent No.: US 7,904,739 B2
(45) Date of Patent: Mar. 8, 2011

(54) MANAGING A POWER STATE FOR A PERIPHERAL

(75) Inventor: Bradley R Larson, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 820 days.

(21) Appl. No.: 11/868,751

(22) Filed: Oct. 8, 2007

(65) Prior Publication Data

US 2009/0094468 A1    Apr. 9, 2009

(51) Int. Cl.
   *G06F 1/32*    (2006.01)
(52) U.S. Cl. .................. 713/323; 713/300; 713/320
(58) Field of Classification Search ........... 713/300–324
   See application file for complete search history.

(56) References Cited

U.S. PATENT DOCUMENTS

| | | |
|---|---|---|
| 5,339,445 A | 8/1994 | Gasztonyi |
| 5,412,809 A | 5/1995 | Tam et al. |
| 5,452,277 A | 9/1995 | Bajorek et al. |
| 5,522,081 A | 5/1996 | Carls |
| 5,530,918 A | 6/1996 | Jasinski |
| 5,542,035 A | 7/1996 | Kikinis et al. |
| 5,546,590 A | 8/1996 | Pierce |
| 5,560,022 A | 9/1996 | Dunstan et al. |
| 5,623,677 A | 4/1997 | Townsley et al. |
| 5,640,574 A | 6/1997 | Kawashima |
| 5,648,799 A | 7/1997 | Kikinis |
| 5,652,893 A | 7/1997 | Ben-Meir et al. |
| 5,742,833 A | 4/1998 | Dea et al. |
| 5,832,283 A | 11/1998 | Chou et al. |
| 5,902,352 A | 5/1999 | Chou et al. |
| 5,991,806 A | 11/1999 | McHann, Jr. |
| 6,189,106 B1 | 2/2001 | Anderson |
| 6,292,831 B1 | 9/2001 | Cheng |
| 6,567,931 B1 | 5/2003 | Jue |
| 6,922,788 B2 | 7/2005 | Eberhard et al. |
| 7,007,180 B2 | 2/2006 | Hashimoto |
| 7,158,245 B2 | 1/2007 | Qiao |
| 2004/0058648 A1* | 3/2004 | Layley et al. ................. 455/41.2 |
| 2005/0154934 A1 | 7/2005 | Kim |
| 2006/0112291 A1 | 5/2006 | Krantz et al. |
| 2006/0206445 A1* | 9/2006 | Andreoli et al. ................. 706/52 |
| 2006/0212732 A1 | 9/2006 | Mashimo et al. |
| 2007/0121626 A1* | 5/2007 | Shepard ........................ 370/389 |
| 2007/0143637 A1 | 6/2007 | Tsai |
| 2007/0162773 A1 | 7/2007 | Krantz et al. |
| 2007/0240002 A1* | 10/2007 | Motoyama .................... 713/320 |

* cited by examiner

*Primary Examiner* — Dennis M Butler (57) ABSTRACT

A method for managing a power state for a peripheral includes listening for activity packets communicated from one or more of a plurality of clients configured to utilize the peripheral. Activity packets received during a selected period are examined. Each activity packet, if any, includes activity data representative of a likelihood that one of the plurality of clients will utilize the peripheral. A power state is selected according to the examination of the activity packets received during the selected period and the peripheral is caused to enter the selected power state.

21 Claims, 8 Drawing Sheets

SETTINGS TABLES 248

THRESHOLD 250 — 254

| POWER STATE 256 | AWAKE 258 | DEFAULT 260 | SELECTED 262 | APPLICATION 264 | DIALOG 266 |
|---|---|---|---|---|---|
| x(1) | a(x) | b(x) | c(x) | d(x) | e(x) |
| x(2) | a(y) | b(y) | c(y) | d(y) | e(y) |
| ... | ... | ... | ... | ... | ... |
| x(z) | a(z) | b(z) | c(z) | d(z) | e(z) |

OVERRIDES 252 — 268

| CLIENT ID 270 | AWAKE 272 | DEFAULT 274 | SELECTED 276 | APPLICATION 278 | DIALOG 280 |
|---|---|---|---|---|---|
| id(1) | x(m1) | x(m2) | x(m3) | x(m4) | x(m5) |
| id(2) | x(n1) | x(n2) | x(n3) | x(n4) | x(n5) |
| id(3) | x(o1) | x(o2) | x(o3) | x(o4) | x(o5) |
| ... | ... | ... | ... | ... | ... |
| id(p) | x(p1) | x(p2) | x(p3) | x(p4) | x(p5) |

MANAGING A POWER STATE FOR A PERIPHERAL

BACKGROUND

Many electronic devices such as computers and printers can automatically enter "sleep" modes when idle. Devices such as laptop computers can quickly be placed in a "sleep" mode. With a touch of a mouse or keyboard, they also wake up quickly. Other devices, such as laser printers, have thermal characteristics that require some time to return to a ready state. User frustration can be high if a printer cannot wake up quickly and return to service to handle a print job. Therefore, such devices are typically designed or configured to be less aggressive in attempts to conserve power. To ensure readiness, such devices are often set in a light sleep mode or full ready mode during normal use hours without regard to actual use.

DETAILED DESCRIPTION

INTRODUCTION: Electronic device users and manufacturers face various pressures to reduce power consumption. These pressures may be economic or regulatory in nature. In addition to reduced power bills, designing devices with energy conscious features can enable the device to comply with regulations controlling whether or not the device can even be sold in a certain market.

Embodiments described below operate to maintain electronic devices such as computer peripherals in a ready state when such devices are likely to be used and power-down or placed in a sleep mode when that likelihood does not exist or is reduced. For example, a device such as a printer is kept in a ready state when there are computers on the network which are actively being used and have that specific printer selected as the output device. By keeping the printer apprised of the status of computers which might print to it, the printer can both be ready more often when a user needs it and be powered down more often when no one is currently in a position to print to it.

Figure 1:
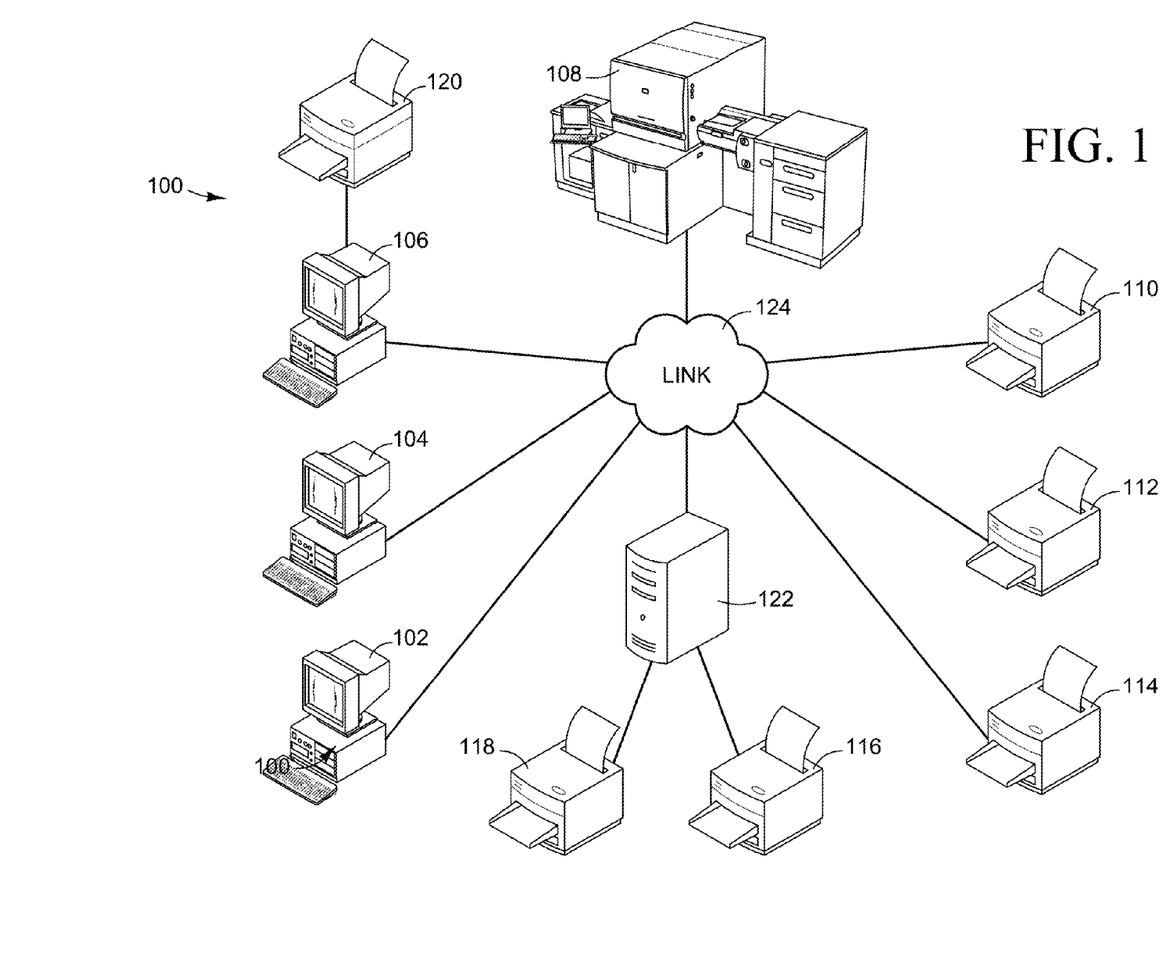
FIG. 1 illustrates an exemplary environment in which various embodiments may be implemented.

ENVIRONMENT: FIG. 1 is an exemplary view of a printing environment 100 that includes clients 102-106, printers 108-120, and print server 122. While FIG. 1 illustrates a particular number of clients, printers, and print servers, it is noted that printing environment can include any number of such devices and configurations. Clients 102-106 each represent generally any combination of hardware and programming capable of generating and communicating a print job to be printed by one of printers 108-120. Printers 108-120 each represent a device capable of producing a printed document from a print job received from one of clients 102-106. In particular, printers 108-114 are network enabled meaning that they can receive print jobs directly communicated from clients 102-106 over a network.

In the example of FIG. 1, printers 116, 118, and 120 are not network enabled. Printers 116 and 118 rely on print server 122 to receive print jobs communicated from clients 102-106. Print server 122 represents generally any combination of hardware and programming configured to represent printers 116 and 118 on a network. In other words, print server 122 is responsible for receiving and queuing print jobs communicated from clients 102-106 and directed to printers 116 and 118. As printer 116 or 118 becomes available, print server 122 releases a print job from that printer's queue. Printer 120 is a shared printer and relies on client 106 to receive print jobs communicated from clients 102 and 104. Client 106 can communicate print jobs directly to printer 120. It is noted that in other implementations, printers 116 and 118 may be network enabled having their own presences on the network while still being represented by print server 122.

Link 124 interconnects clients 102-106, printers 108-114, and print server 122. Link 124 represents generally a cable, wireless, or remote connection via a telecommunication link, an infrared link, a radio frequency link, or any other connector or system of connectors that provides electronic communication between clients 102-106, printers 108-114, and print server 122. It is noted that printers 116 and 118 are shown having a direct cable or wireless connection to print server 122. Printer 120 is shown to have a direct cable or wireless connection to client 106. These direct cable connections allow printer server 122 and client 106 to communicate print jobs to printers 116-120.

Figure 2:
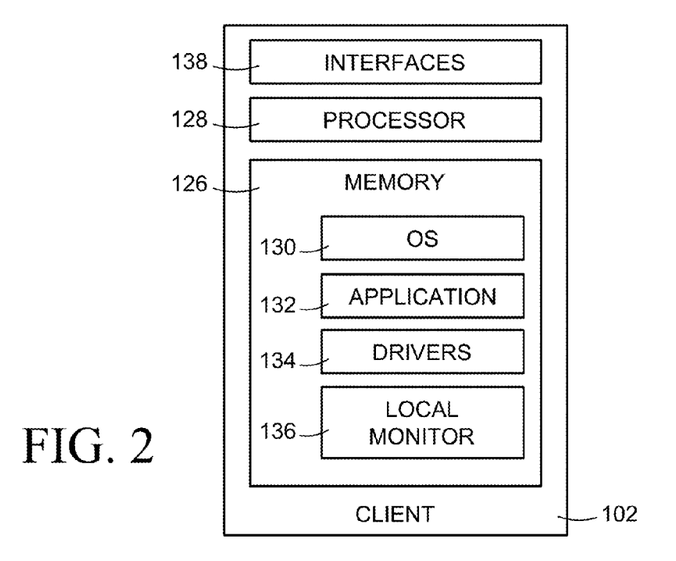
FIGS. 2-5 are exemplary block diagrams illustrating physical and logical components of various embodiments.

COMPONENTS: FIGS. 2-5 are blocks diagrams illustrating exemplary physical and logical components of clients 102-106, printers 108-114, and print server 122. FIG. 2 is a block diagram of a client, in this case 102. However, FIG. 2 could also be a block diagram of client 104. A block diagram of client configured to share a printer such as client 106 is shown in FIG. 5 and discussed below. Continuing with FIG. 2, client 102 is shown to include memory 126 and processor 128. While shown as a single block, memory 126 may include one or more disparate memory types. For example, memory 126 may include any combination of random access memory, read only memory, hard disk drives, flash memory, and the like. Processor 128 represents generally any processor capable of executing program instructions stored in memory 126.

Memory 126 is shown to include OS (Operating System) 130, application 132, drivers 134 and local monitors 136. OS 130 represents a software platform on top of which other programs, called applications, can run. OS 130 is also responsible for performing basic tasks, such as recognizing input from a keyboard and mouse, sending output to a display screen, keeping track of files and directories in memory 126, and controlling peripheral devices such as printers. Examples of OS 130 include Microsoft's Windows operating systems, Linux, and various operating systems offered by Apple.

Application 132 represents generally any programming or combination of programming compatible with OS 130 that when executed can be used to print a document. For example, application 132 may be a word processor or web browser. Drivers 134 represent one or more programs that control printers 108-120. One or more of drivers 134 may be part of OS 130. Others may be stand alone programs. In either case, drivers 134 cooperate with OS 130 to enable application 132 to print a document. As an example, a given driver 134, working with OS 130, may be configured to receive a print instruction from application 132 for a particular electronic document. That driver 134 converts the electronic document into a print job formatted for a particular one of printers 108-120. In short, drivers 134 act as translators between application 132 and printers 108-120.

Local monitor 136 represents generally any programming or combination of programming that when executed generates and communicates data representative of a likelihood that client 102 will send a print job to a printer. This data is communicated in an activity packet and may be directed to a particular printer installed on client 102, a select group of printers installed on client 102, or all printers installed on client 102. It can be said that printer is installed on client 102 when client 102 includes a driver for that printer. As long as client 102 is active, that is turned on and not placed in a sleep mode, local monitor 136 repeatedly communicates such activity packets at specified intervals.

In one example, an activity packet is a collection of data categorized according to various states of client 102 that are at least indirectly related to printing. The activity categories may include data indicating whether or not client 102 is active, whether or not a particular printer is set as a default printer for client 102, whether or not an application that might print is running, and whether or not a print dialog for a particular printer has been opened.

To generate an activity packet, local monitor 136 observes activity on client 102. As examples, local monitor 136 can determine that client 102 is active by communicating with OS 130 to determine if an input device such as a mouse or keyboard have been or are being used or if client 102 is being accessed remotely. Local monitor 136 can also query OS 130 to determine which printer is set as a default printer, to determine if an application capable of printing is currently running, and to determine if a print dialog is open and a particular printer is selected. As an example, local monitor 136 may query a registry for OS 130 to identify which printer is selected as a default printer and to identify which printer is a currently selected printer. Note a currently selected printer may or may not be the default printer. In another example, the driver for a printer could be configured to communicate with local monitor 136. OS 130 provides a standard print dialog. When that dialog is opened, OS 130 identifies the currently selected printer or default printer and communicates that information to that printer's driver. In such a case, the printer driver could then communicate this activity to local monitor 136. In other examples, local monitor 136 observes or queries OS 130 to identify open windows as well as active open windows to determine if an application that might use a printer is open. Local monitor 136 generates an activity packet containing data indicative of these determinations. Examples of such activity packets are discussed below with respect to FIGS. 6 and 7.

Client 102 is also shown to include interface 138. Interface 138 represents generally any combination of hardware and programming capable of functioning as a port through which client 102 can communicate activity packets to one or more printers. Examples include wired and wireless interfaces such as wired Ethernet, USB, and firewire ports and wireless Ethernet, infrared, and Bluetooth ports.

Figure 3:
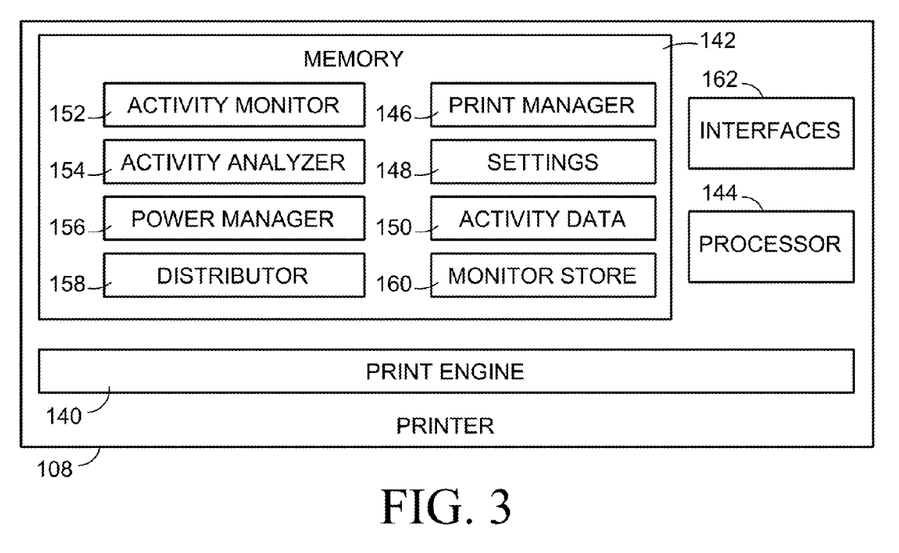

FIG. 3 is a block diagram of a printer, in this case printer 108. However, FIG. 3 could also be a block diagram of printers 110-114. Printer 108 is shown to include print engine 140, memory 142, and processor 144. Print engine represents generally any combination of hardware and programming capable of producing printed output on a physical medium such as a sheet of paper. While shown as a single block, memory 142 may include one or more disparate memory types. For example, memory 142 may include any combination of random access memory, read only memory, hard disk drives, flash memory, and the like. Processor 144 represents generally any processor capable of executing program instructions stored in memory 142.

Memory 142 is shown to include print manager 146, settings 148, activity data 150, activity monitor 152, activity analyzer 154, power manager 156, distributor 158, and monitor store 160. Print manager 146 represents generally any programming or combination of programming that when executed is capable of directing print engine 140 to produce a physical printed representation of a print job. Settings 148 represent a collection of data used to select a power state for printer 108. Settings 148 may be factory assigned settings, default settings, or user defined settings. An example of settings 148 is discussed below with respect to FIG. 8. Activity data 150 represents activity packets received by printer 108. An example of activity data 150 is discussed below with respect to FIG. 7

Activity monitor 152 represents generally any programming or combination of programming that when executed is capable of listening for and recording activity packets communicated from one or more clients that are configured to use printer 108. In this example, activity monitor 152 records the activity packets in activity data 150. Activity analyzer 154 represents generally any programming or combination of programming that when executed is capable of accessing activity data 150 to examine activity packets received from two or more clients during a selected period. Power manager 156 represents generally any programming or combination of programming that when executed is capable of selecting a power state according to the examination of the activity packets received during the selected period and of causing printer 108 to enter the selected power state.

To elaborate, using information from settings 148, activity analyzer 154 can examine activity data to identify one or more possible power states corresponding to activity data 150. Power manager 156 selects the most active of those power states. For example, printer 108 may be capable of being placed in a ready state, a light sleep state, and a hibernation state. The ready state would be the most active state. The hibernation state would be the least active taking the most time from which to recover to the ready state. In short the most active of a set of power states is the state from which recovery to an active state takes the least amount of time. More specific examples of the operation of activity monitor 152, activity analyzer 154, and power manager 156 are discussed below in more detail with respect to FIGS. 6-10.

Distributor 158 represents generally any programming or combination of programming that when executed is capable of distributing a local monitor to a client. Monitor store 160 represents a collection of local monitors compatible with various operating systems. For example, distributor 158 may be a web server and corresponding web page or web service configured to access monitor store 160 and distribute an appropriate local monitor to a requesting client.

Printer 108 is also shown to include interface 162. Interface 162 represents generally any combination of hardware and programming capable of functioning as a port through which printer 108 can listen for and receive activity packets and print jobs. Examples include wired and wireless interfaces such as wired Ethernet, USB, and firewire ports and wireless Ethernet, infrared, and Bluetooth ports.

Figure 4:
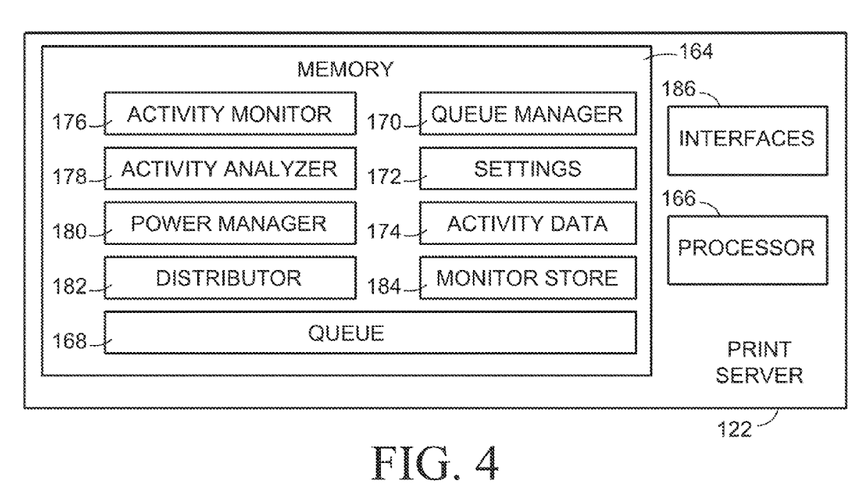
Figure 5:
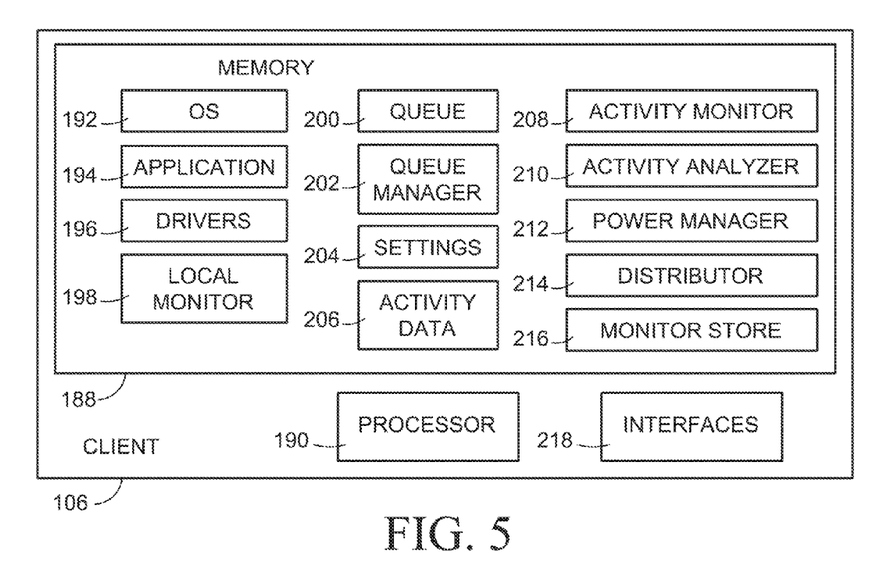

FIG. 4 is a block diagram of a print server, in this case print server 122. Print server 122 is shown to include memory 164 and processor 166. While shown as a single block, memory 164 may include one or more disparate memory types. For example, memory 164 may include any combination of random access memory, read only memory, hard disk drives, flash memory, and the like. Processor 166 represents generally any processor capable of executing program instructions stored in memory 164.

Memory 164 is shown to include queue 168, queue manager 170, settings 172, activity data 174, activity monitor 176, activity analyzer 178, power manager 180, distributor 182, and monitor store 184. Queue 168 represents a print queue for one or more printers represented by print server 122. Queue manager 170 represents generally any programming or combination of programming that when executed is capable of directing print jobs from queue 168 to an appropriate printer represented by print server 122.

Settings 172 represent a collection of data used to select a power state for a printer represented by print server 122. Settings 172 may be factory assigned settings, default settings, or user defined settings. An example of settings 172 is discussed below with respect to FIG. 8. Activity data 174 represents activity packets received by print server 122. An example of activity data 174 is discussed below with respect to FIG. 7

Activity monitor 176 represents generally any programming or combination of programming that when executed is capable of listening for and recording activity packets communicated from one or more clients that are configured to use a printer represented by print server 122. In this example, activity monitor 176 records the activity packets in activity data 174. Activity analyzer 178 represents generally any programming or combination of programming that when executed is capable of accessing activity data 174 to examine activity packets received from two or more clients during a selected period. Power manager 180 represents generally any programming or combination of programming that when executed is capable of selecting a power state according to the examination of the activity packets received during the selected period and of causing a printer represented by print server 122 to enter the selected power state. More specific examples of the operation of activity monitor 176, activity analyzer 178, and power manager 180 are discussed below in more detail with respect to FIGS. 6-10.

Distributor 182 represents generally any programming or combination of programming that when executed is capable of distributing a local monitor to a client. Monitor store 184 represents a collection of local monitors compatible with various operating systems. For example, distributor 182 may be a web server and corresponding web page or web service configured to access monitor store 184 and distribute an appropriate local monitor to a requesting client.

Print server 122 is also shown to include interface 186. Interface 186 represents generally any combination of hardware and programming capable of functioning as a port through which print server 122 can listen for and receive activity packets and print jobs and a port through which print server 122 can communicate with a represented printer. Examples include wired and wireless interfaces such as wired Ethernet, USB, and firewire ports and wireless Ethernet, infrared, and Bluetooth ports.

FIG. 5 is a block diagram of a client configured to share a printer, in this case client 106. Client 106 is shown to include memory 188 and processor 190. While shown as a single block, memory 188 may include one or more disparate memory types. For example, memory 188 may include any combination of random access memory, read only memory, hard disk drives, flash memory, and the like. Processor 190 represents generally any processor capable of executing program instructions stored in memory 188.

Memory 188 is shown to include OS (Operating System) 192, application 194, drivers 196, local monitor 198, queue 200, and queue manager 202. OS 192 represents a software platform on top of which other programs, called applications, can run. OS 192 is also responsible for performing basic tasks, such as recognizing input from a keyboard and mouse, sending output to a display screen, keeping track of files and directories in memory 188, and controlling peripheral devices such as printers. Examples of OS 192 include Microsoft's Windows operating systems, Linux, and various operating systems offered by Apple.

Application 194 represents generally any programming or combination of programming compatible with OS 192 that when executed can be used to print a document. For example, application 194 may be a word processor or web browser. Drivers 196 represent one or more programs that control printers 108-118 and at least one that controls printer 120. One or more of drivers 196 may be part of OS 192. Others may be stand alone programs. In either case, drivers 196 cooperate with OS 192 to enable application 194 to print a document. As an example, a given driver 196, working with OS 192, may be configured to receive a print instruction from application 194 for a particular electronic document. That driver 196 converts the electronic document into a print job formatted for a particular one of printers 108-120. In short, drivers 196 act as translators between application 194 and printers 108-120.

Local monitor 198 represents generally any programming or combination of programming that when executed generates and communicates data representative of a likelihood that client 106 will send a print job to a printer. This data is communicated in an activity packet and may be directed to a particular printer installed on client 106, a select group of printers installed on client 106, or all printers installed on client 106. A printer is installed on client 106 when client 106 includes a driver for that printer. As long as client 106 is active, that is turned on and not placed in a sleep mode, local monitor 198 repeatedly communicates such activity packets at specified intervals.

In this example OS 192 is configured to share printer 120 for use by other clients, in this case clients 102 and 104. Queue 200 represents a print queue for printer 106. Queue manager 202 represents generally any programming or combination of programming that when executed is capable of directing print jobs from queue 200 to printer 120. Such print jobs may be generated by client 106 and by clients 102 and 104.

Memory 188 is also shown to include settings 204, activity data 206, activity monitor 208, activity analyzer 210, power manager 212, distributor 214, and monitor store 216. Settings 204 represent a collection of data used to select a power state for a printer shared by client 106, in this case printer 120. Settings 204 may be factory assigned settings, default settings, or user defined settings. An example of settings 204 is discussed below with respect to FIG. 8. Activity data 206 represents activity packets received by client 106. An example of activity data 206 is discussed below with respect to FIG. 7

Activity monitor 208 represents generally any programming or combination of programming that when executed is capable of listening for and recording activity packets communicated from one or more clients that are configured to use a printer shared by client 106. In this example, activity monitor 208 records the activity packets in activity data 206. Activity analyzer 210 represents generally any programming or combination of programming that when executed is capable of accessing activity data 206 to examine activity packets received from two or more clients during a selected period. Power manager 212 represents generally any programming or combination of programming that when executed is capable of selecting a power state according to the examination of the activity packets received during the selected period and of causing a printer shared by client 106 to enter the selected power state. More specific examples of the operation of activity monitor 208, activity analyzer 210, and power manager 212 are discussed below in more detail with respect to FIGS. 6-10.

Distributor 214 represents generally any programming or combination of programming that when executed is capable of distributing a local monitor to a client. Monitor store 216 represents a collection of local monitors compatible with various operating systems. For example, distributor 214 may be a web server and corresponding web page or web service configured to access monitor store 216 and distribute an appropriate local monitor to a requesting client.

Client 106 is also shown to include interface 218. Interface 218 represents generally any combination of hardware and programming capable of functioning as a port through which printer client 106 can listen for and receive activity packets and print jobs and a port through which client 106 can communicate with a shared printer such as printer 120. Examples include wired and wireless interfaces such as wired Ethernet, USB, and firewire ports and wireless Ethernet, infrared, and Bluetooth ports.

Figure 6:
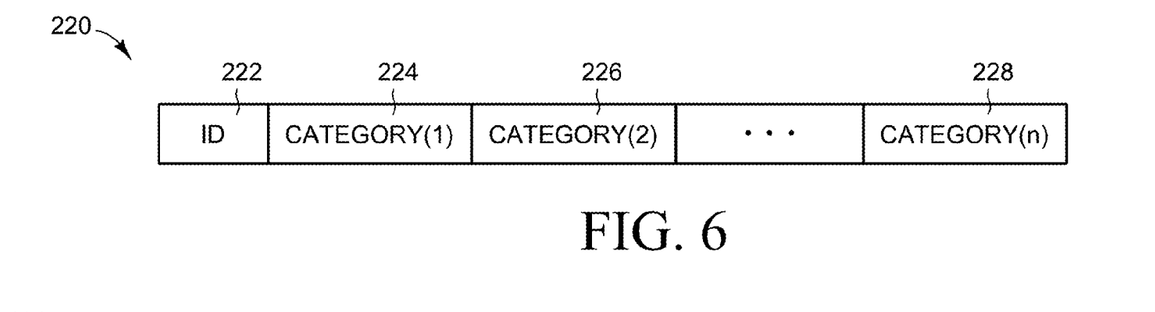
FIG. 6 is a block diagram of an exemplary activity packet.

FIG. 6 illustrates and exemplary activity packet 220. In this example activity packet 220 is a collection of data portions and includes an ID portion 222 and a plurality of category portions 224, 226, and 228. ID portion 222 represents data identifying the client that generated the activity packet and may also represent data identifying a particular printer to which activity packet 220 is addressed. With this configuration, a client can broadcast an activity packet to all printers installed on that client. The printer to which the packet is addressed will receive and analyze the packet. Other printers can ignore the packet.

Each category portion 224-228 represents data indicative of client activity in a particular activity category. Activity packet 220 can include any number of category portions 224-228. Each category portion contains data representative of a state of a client that generated activity packet 220. The state represented by data in a category portion 224, 226, and 228 is at least indirectly related to a likelihood that the client will utilize a printer to which activity packet 220 is directed. It is noted that while activity packet 220 is shown to include a plurality of category portions 224, 226, and 228, different activity packets can contain differing activity portions. For example, a given client may identify activity in one category. A resulting activity packet may include only one activity portion for that particular activity category. In another implementation, an activity packet may include activity portions for each of a plurality of categories even though the value reported in a given activity portion is null representing no activity with respect to a given category.

Data in activity portions 224, 226, and 228 may include data in activity categories that indicate whether or not a client is active, whether or not a particular printer is set as a default printer for that client, whether or not an application that might print is running, and whether or not a print dialog for a particular printer has been opened on that client. This is simply an exemplary list of possible types of activity categories. Other categories of activity that correspond at least indirectly to a likelihood that a client will utilize a peripheral such as a printer are, of course, contemplated.

Data in an activity portion 224, 226, or 228 may be formatted as a flag or other representation of a client's state. For example, data in an activity portion 224, 226, or 228 may be a zero or a one—zero indicting non activity and a one indicating activity in the relevant category. Data in category portion 228 may be a one indicating that a print dialog is open on a particular client. Instead, the data may be a zero indicating that no print dialog is open. It is noted that flags may be zeros and ones or any other symbols indicative of on and off or yes and no.

Flags may also be capable of conveying state levels. For example a zero may represent an off or inactive state for a given activity category while a five, ten, or other number can indicate a most active state while numbers in between represent various intermediary active states. Data in category portion 226 may be a zero indicating that no printing application is open, a one indicating that one printing application is open, or a higher number indicating the number of printing applications that are open on a particular client.

Figure 7:
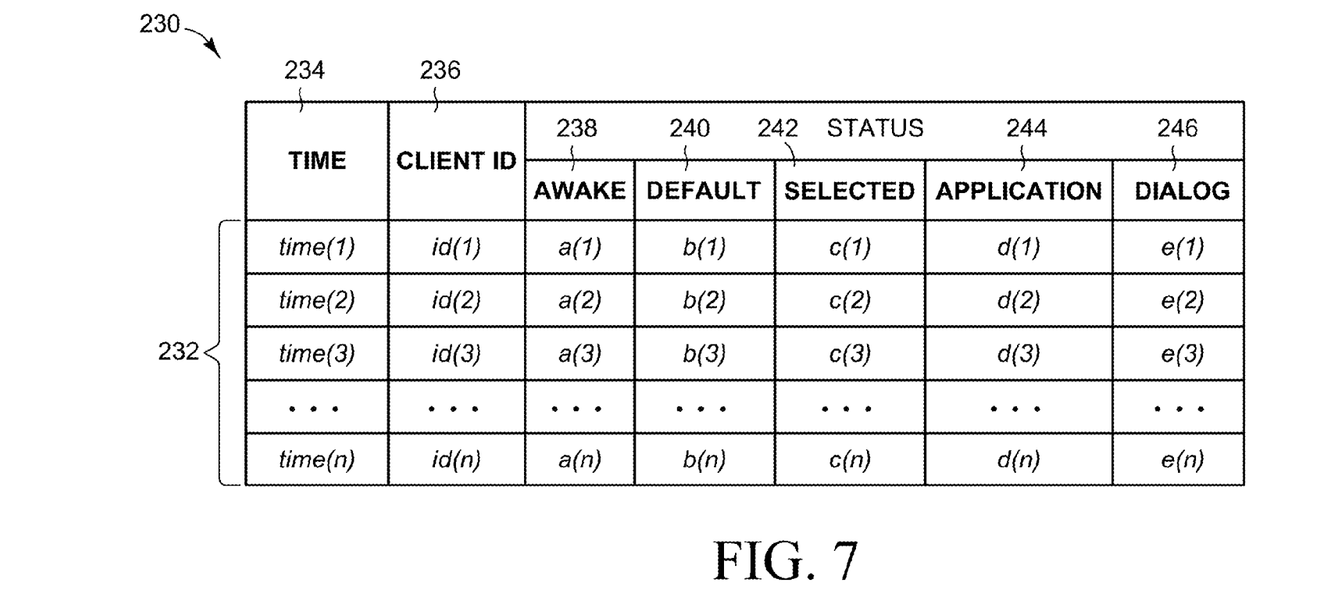
FIG. 7 illustrates an example of activity data presented in a status table.

FIG. 7 illustrates status table 230. Status table 230 is an exemplary implementation of activity data such as activity data 150, 174, or 206 shown in FIGS. 3, 4, and 5 respectfully. Status table 230 includes a number of entries 232 each corresponding to a received activity packet. Each entry 232 includes data in a time field 234, a client ID field 236 and in a number of activity category fields 238-246. Data in activity category fields 238-246 correspond to a likelihood that a particular client will use a particular printer. In this example, those activity category fields are labeled as awake field 238, default field 240, selected field 242, application field 244, and dialog field 246. As an activity packet is received, an entry 232 is created for that packet. Data in time field 234 indicates a time that the activity packet was received or generated. Using this information, activity packets received or generated in a selected period such as within the last set number of seconds, minutes, or other duration, can be identified and analyzed.

Data in client ID field 236 identifies a client that generated the activity packet. Data in awake field 238 indicates whether or not the identified client is active or otherwise awake. Data in default field indicates whether or not the particular printer is set as a default printer for the identified client. Data in selected field 242 indicates whether or not that printer is a selected printer for an application running on the identified client. Data in application field 244 indicates whether or not a printing application is running on the identified client. Data in dialog field 246 indicates whether or not the client has opened a print dialog for the particular printer. While activity category fields 238-246 are shown with particular labels, status table may have entries with different labels that correspond to other activity categories of received activity packets.

Figure 8:
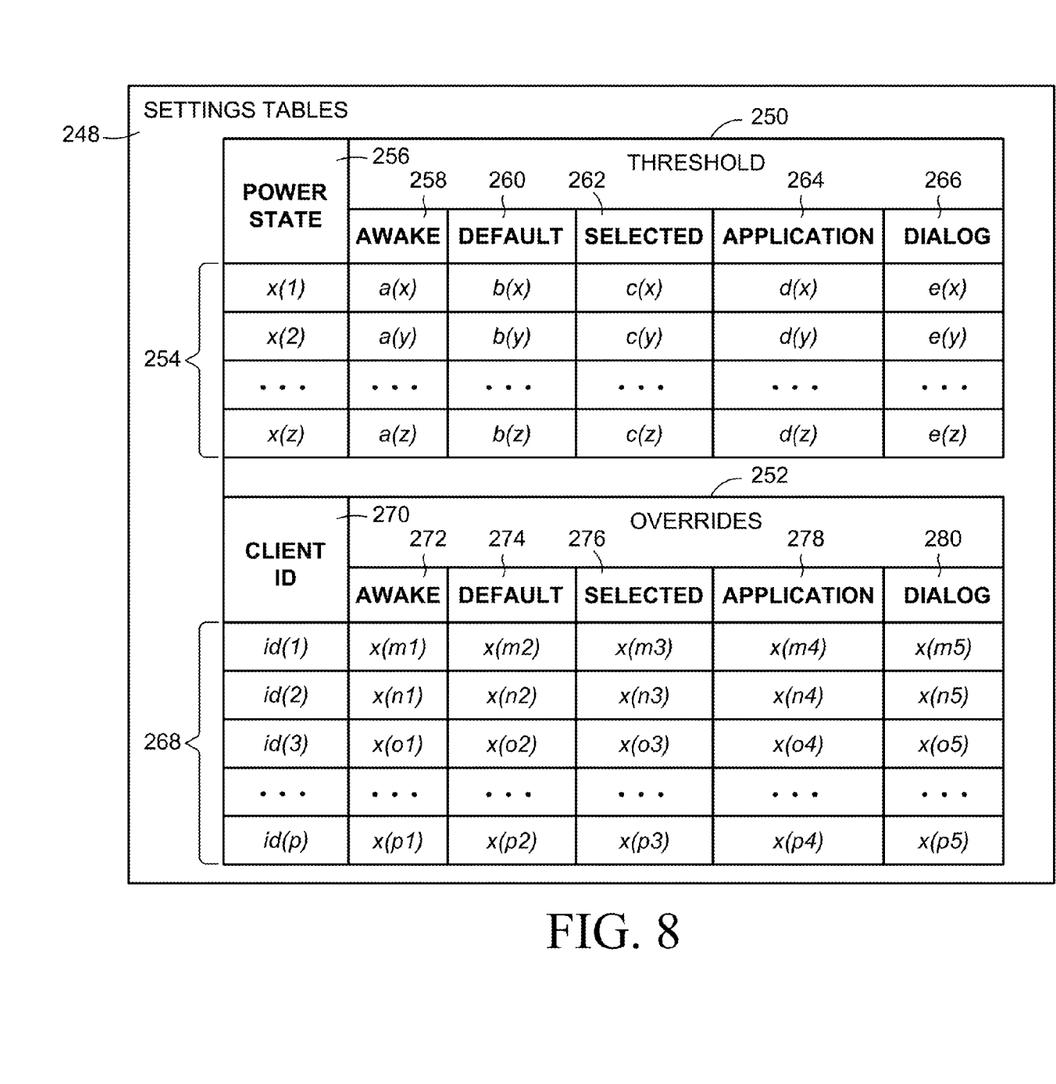
FIGS. 8 and 9 illustrate exemplary power management settings.

FIG. 8 illustrates look up tables 248 which include threshold table 250 and override table 252. Look up tables 248 represent data found in settings 148, 172, or 204 shown in FIGS. 3, 4, and 5 respectfully. Threshold table 250 represents a collection of data used to select a power state based on an analysis of activity packets received during a selected time period. Override table 252 represents data used to select a power state according to an activity packet received from a priority client. A priority client is a client for which a power state can be selected based only on an activity packet received from that client. If more active, a power state identified using override table 252 can override a power state selected using threshold table 250. Priority clients are discussed below in more detail.

Threshold table 250 includes entries 254. Each entry 254 corresponds to a power state 256 that may be selected for a printer. These power states vary from least to most active. It is noted that threshold table 250 can include any number of entries 254. For example, one entry 254 labeled X(1) may correspond to a ready state in which the printer is ready to print. Another entry 254 labeled X(2) may correspond to a sleep state in which some certain functions of the printer are powered down. Another entry 254 labeled X(z) may correspond to a hibernate state in which more if not most of the printers features are powered down. In this example, power state X(1) would be the most active and power state X(z) would be the least active.

Each entry 254 in threshold table 250 contains a series of activity threshold fields 258-266. Each activity threshold field includes a threshold value corresponding to a particular activity category of an activity packet. A threshold value is a value that when met or exceeded provides an indication that a corresponding power state may be identified. When more than one threshold value of threshold table is met, then a plurality of different corresponding power states may be identified. The most active of those identified power states is then selected.

In the example of FIG. 8, each entry 254 contains a threshold value in awake field 258, default field 260, selected field 262, application field 264, and dialog field 266. Awake field 258 is related to a state in which a client is active. Default field 260 is related to a state in which a client has selected a particular printer as a default printer. Selected field 262 is related to a state in which a client is running an application that has selected the particular printer. Application field 264 is related to a state in which a client is running a printing application, and dialog field 266 is related to a state in which a client has opened a dialog for the particular printer. The threshold value for each field 258-266 for each entry 254 may be factory set, default values, or user selected values.

Referring to FIGS. 7 and 8, before using threshold table 250, an activity analyzer accesses status table 230 and analyzes activity packets received during a specified period. Status table 230 may contain any number of activity packets received during that period from any number of clients. As explained above, values in fields 238-246 of status table entries 232 may be a flag having particular numerical value—a zero representing inactivity and one or other positive number representing some level of activity. The activity analyzer can sum the values found in common fields of entries 232 for those activity packets received during the specified period. Each particular sum represents an activity level for a particular activity category. For example, the value of a given sum can correspond to the number of clients that are active, the number of active clients that have the particular printer set as a default printer, the number of clients that are running an application that has the particular printer selected, the number of clients that are running printing applications, or the number of applications that have open dialog boxes for the selected printer.

Viewing FIG. 8, each sum corresponds to an activity field 258-266 of entries 254 in threshold table 250. The activity analyzer compares each particular sum to the threshold values found in a corresponding activity field 258-266 of each entry 254. As noted above, each entry 254 corresponds to a particular power state identified in that entry's power state field 256. By identifying the entry that contains the field with the largest threshold value met or exceeded by a particular sum, the activity analyzer also identifies a power state that corresponds to the activity level represented by that sum.

For example, threshold values for awake fields 258 of entries 254 may be ten, six, and zero respectively. The activity analyzer may examine status table 230 of FIG. 7 and determine that seven clients reported being active during the specified period. The activity analyzer would then determine that the particular sum of seven exceeds the threshold values of zero and six but not ten. For that particular sum, the activity monitor would then identify the particular power state, X(2), corresponding to the entry 254 that contains the threshold value of six in awake field 258. The activity analyzer would then identify power states for the remaining activity categories represented by fields 260-266. A power manager would then select the most active of those identified power states.

Continuing the example, threshold values for dialog field 266 of entries 254 may be two, one, and zero, respectively. The activity analyzer may examiner status table 230 of FIG. 7 and determine that two clients reported as having open print dialogs for the particular printer during the specified period. The activity analyzer would then determine that the particular sum of two meets or exceeds the threshold values of zero, one, and two. For that particular sum, the activity monitor would then identify the particular power state, X(1), corresponding to the entry 254 that contains the threshold value of two in dialog field 266. Assuming that power state X(1) is more active than the power state X(2), the power manager would select power state X(1).

Still referring to FIG. 8, override table 252 includes entries 268. Each entry 268 corresponds to a priority client and contains data in fields 270-280. Client ID field 270 represents data identifying a particular client while fields 272-280 correspond to various activity categories discussed above. The data in an activity category field 272-280 for a given entry identifies a particular power state if the identified client reports activity in an activity packet received during a specified period. The power states for various activity category entries 272-280 for a given entry 268 can vary. As such, when an activity packet received from a priority client specifies activity in two or more activity categories, entry 268 for that priority client would then indentify multiple power states. In such a case, the most active of those power states would be selected so long as that power state is more active that the most active power state identified using threshold table 250.

In use, an activity analyzer accesses status table 230 and analyzes activity packets received during a specified period. Status table 230 may contain any number of activity packets received during that period from any number of clients. The activity analyzer would then identify any of those packets that were received from a priority client. To do so the activity analyzer may compare data in client ID field 236 of each relevant entry 232 of status table 230 with data in client ID field 270 of each entry 268 in override table 252. A match would indicate that an activity packet has been received from a priority client. For each entry 232 in status table 230, activity analyzer determines in which activity categories the priority clients have been active. For each entry 232 corresponding to an activity packet received from a priority client, the activity analyzer compares the priority clients reported activity with that priority client's entry 268 in override table 252. As noted above, a priority client's activity may indicate differing power states. If so the most active power state is identified. Similarly, activity of two or more priority clients may indicate differing power states. Again, the most active power state is identified.

Combining the discussion of threshold table 250 and override table 252, a first power state may be identified as most active using threshold table 250 and a second power state identified as most active using override table 252. In such a case a power manager would select the most active of the two identified power states.

In this manner, activity reported from a single priority client can override a power state that would otherwise be selected. As an example, it may be important in a given printing environment that a particular printer be ready whenever a particular priority client is active. In this example, that client's entry 268 in override table 252 would include data in awake field 272 identifying a ready power state. Threshold table 250 may indicate that at least ten clients are to be active to justify a ready power state. In this example, the receipt of a single activity packet reporting activity by the priority client would result in the printer being placed in a ready power state overriding any power state identified using threshold table 250. However, if a power state identified using threshold table 250 were the more active, then that power state would be selected. In other words, a power state selected using override table will not always be selected.

As noted above with reference to threshold table 250, the threshold value for each field 258-266 for each entry 254 may be factory set, default values, or user selected values. In another implementation, the threshold value for each field 258-266 may be calculated or otherwise determined based on the day of the week and time of day. For example, Look up tables 248 of FIG. 8 may include a plurality of threshold tables 250 each corresponding to different time periods for each day of the week. Thus, the particular threshold table 250 used would change based on the time of day and day of the week. As such the particular threshold values can also change from time to time and day to day.

The threshold values in a threshold table 250 can also be updated based on observed use. For example, it may be observed that a printer is typically in use or otherwise held in an awake or ready state during certain time periods of certain days of the week. The threshold table 250 for those time periods would include threshold values selected so that the peripheral will be more likely to be kept in an awake or ready state. As use patterns change, the threshold values would also change.

Furthermore, a threshold value for one activity category may be dependent upon an activity level measured for another activity category. Referring to the exemplary discussion of FIG. 7 above, the activity level for a particular activity category can be measured by summing corresponding flag values located in status table 230. As an example, the threshold value for one activity category might decrease as the measured activity level for another activity category increases. Likewise, the threshold value for that activity category might increase as the measured activity level for the other activity category decreases.

In the previous examples, a different power state is identified for each activity category by comparing a measured activity level for that category with various threshold values. The most active of those identified power states is selected. In a slightly different fashion, the activity level measured for each activity category can be algorithmically weighted. The weighted activity levels could then be summed or otherwise combined resulting in a value representative of a probability that printing is going to happen. That combined weighted activity value can then be compared to threshold values set for the possible power states. The most active power state whose corresponding threshold value is met or exceeded is then selected.

Figure 9:
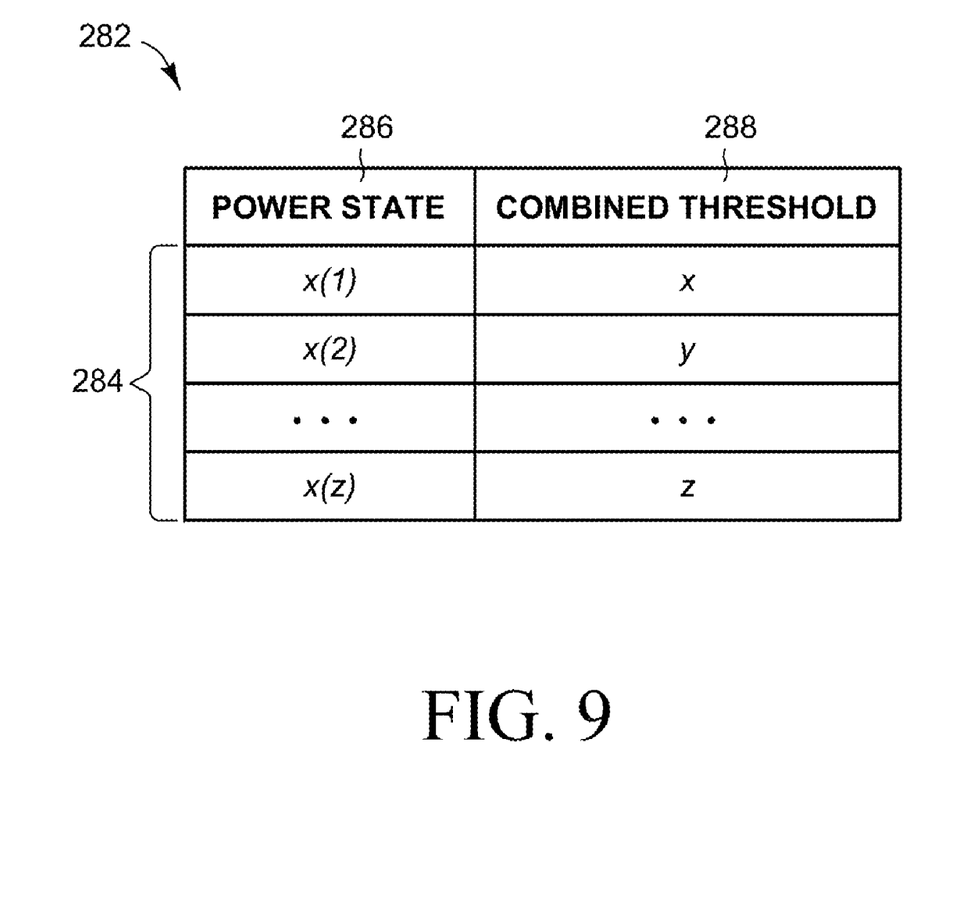

FIG. 9 illustrates an example of a combined threshold table 282 that may replace or be used in addition to threshold table 250. Combined threshold table 282 is shown to include entries 284. Each entry 284 corresponds to a power state 286 that may be selected for a printer. These power states vary from least to most active. It is noted that threshold table 282 can include any number of entries 284. For example, one entry 284 labeled X(1) may correspond to a ready state in which the printer is ready to print. Another entry 284 labeled X(2) may correspond to a sleep state in which some certain functions of the printer are powered down. Another entry 284 labeled X(z) may correspond to a hibernate state in which more if not most of the printers features are powered down. In this example, power state X(1) would be the most active and power state X(z) would be the least active.

As discussed above the activity level measured for each activity category can be algorithmically weighted, and the weighted activity levels could then be summed resulting in a value representative of a probability that printing is going to happen. The following is an example equation for calculating a combined weighted activity value.

$$F_1 \times AL_1 + F_2 \times AL_2 + \ldots + F_n \times AL_n$$

In this example, $AL_1$ through $AL_n$ represent the measured activity levels for n activity categories. $F_1$ through $F_n$ represent weighting factors. Activity within certain activity categories can provide a better indication that printing is about to occur. For example, the opening of a print dialog is typically more indicative of printing than simply opening an application. As such, the weighting factor for a given measured activity level may be selected accordingly.

Each entry 284 contains a combined threshold value 288. The combined threshold value for each entry 284 may be factory set, default values, or user selected values. Using combined threshold table 282, a combined weighted activity value is compared against each combined threshold value in fields 288 of entries 284. The most active power state whose corresponding combined threshold value is met or exceeded is then selected.

Figure 10:
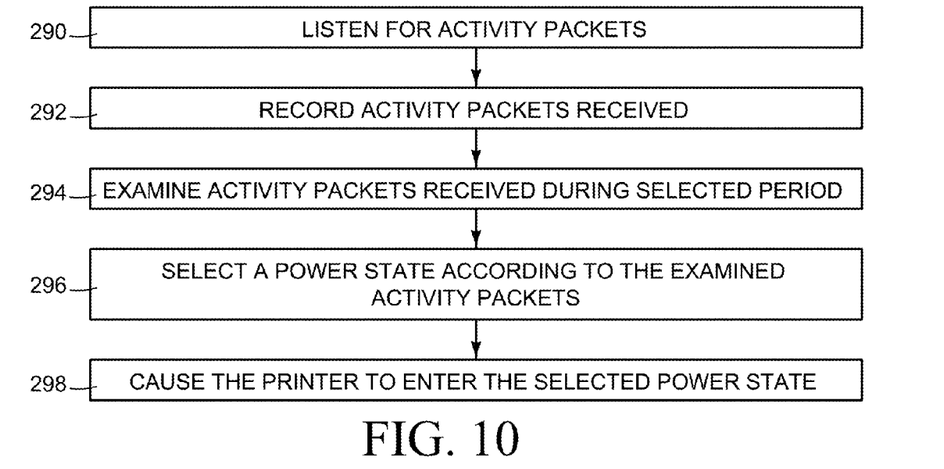
FIGS. 10-12 are exemplary flow diagrams of steps for implementing various embodiments.
Figure 11:
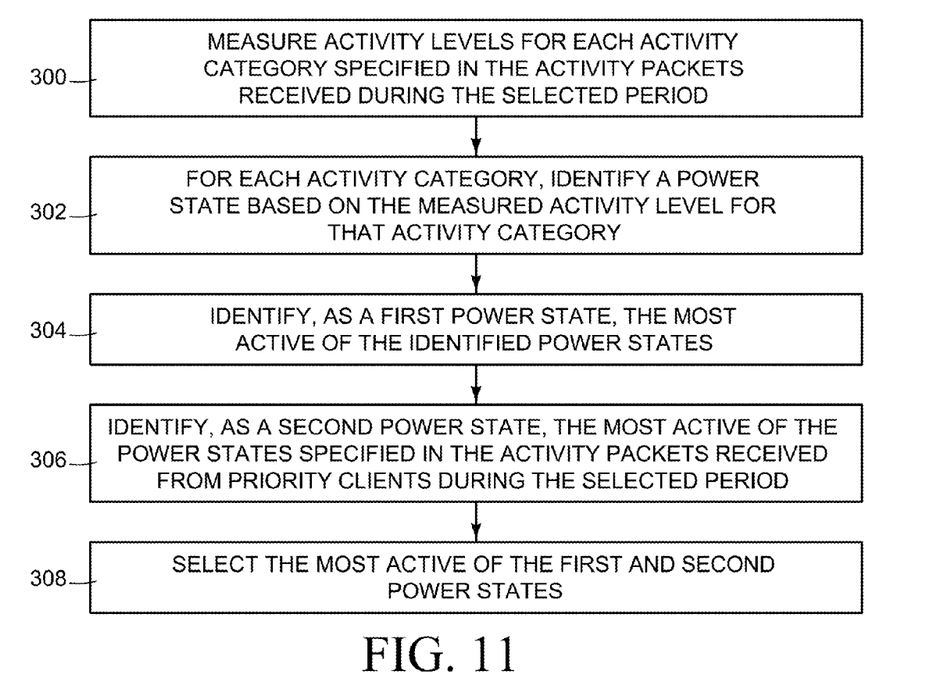
Figure 12:
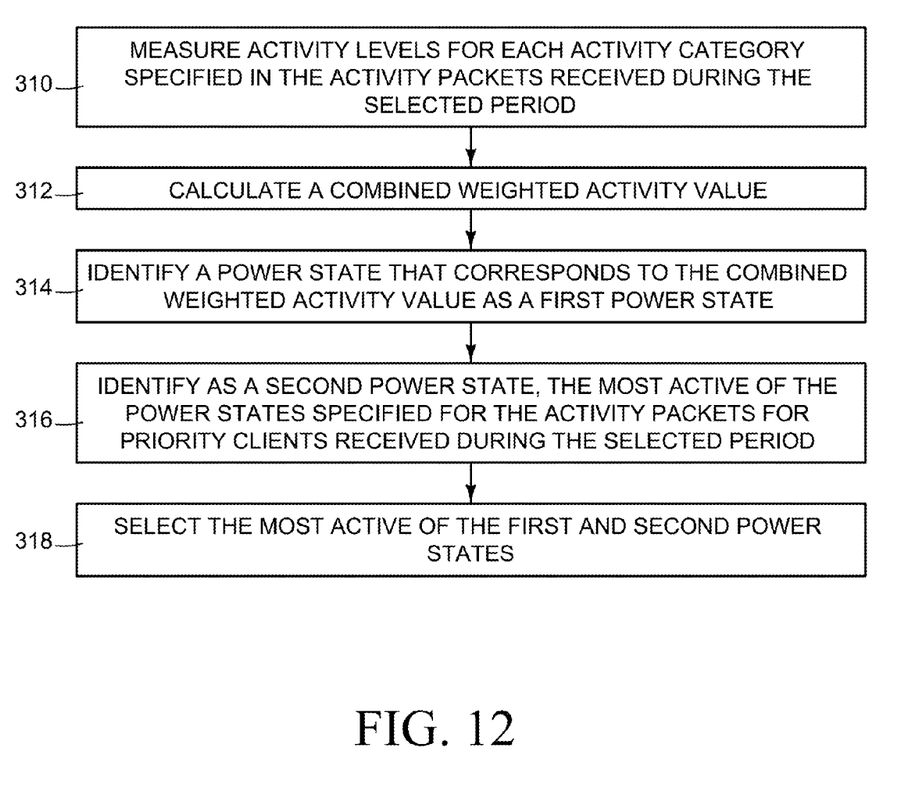

OPERATION: FIGS. 10-12 are exemplary flow diagrams illustrating steps for implementing various embodiments. Starting with FIG. 10, activity packets are listened for (step 290). Referring back to FIGS. 3-5, step 290 may be accomplished by activity monitor 152, 176, or 208 associated with a particular printer. Received activity packets are recorded (step 292). Step 292 may be accomplished once activity monitor 152, 176, or 208 hears and identifies an activity packets directed to its associated printer.

Activity packets received during a specified period are analyzed (step 294). A power state is then selected according to the examined activity packets (step 296) and the printer is caused to enter the selected power state (step 298). Step 294, for example, may be performed by activity analyzer 154, 178, or 210 of FIGS. 3-5 while steps 296 and 298 may be performed by power manager 156, 180, or 212. Examples of steps 294 and 296 are discussed in more detail below with respect to FIG. 10.

Moving on to FIG. 11, steps 300-306 expand on step 294 of FIG. 10 while step 308 is an example of step 296. In step 300, activity levels for each activity category specified in the activity packets received during the selected period are measured. Referring to the exemplary discussion of FIG. 7 above, the activity level for a particular activity category can be measured by summing corresponding flag values located in status table 230.

For each activity category, a power state is identified based upon the measured activity level for that activity category (step 302). Referring to the exemplary discussion of FIG. 8 above, the power state for an activity category can be identified by identifying a largest corresponding threshold value in threshold table 250 that is met or exceeded by the measured activity level for that activity category. A corresponding threshold value, in this case, is a threshold value contained in an entry 254 and found in a field 258, 260, 262, 264, or 266 that corresponds to the particular activity category. The most active of the power states identified in step 302 is identified as a first power state (step 304).

A second power state is identified (step 306). The second power state is the most active of the power states specified for the activity packets received from priority clients during the selected period. Referring to the exemplary discussion of FIG. 8 above, activity packets can be identified as having been received from a priority client by referring to override table 252. Power states specified for a given priority client can then be identified by comparing an activity packet received from a priority client with that priority client's entry 268 in override table 252. The most active specified power state is identified as the second power state. Finally, the most active of the first and second power states is then selected (step 308).

FIG. 12 illustrates a variation on FIG. 11 with steps 310-316 expanding on step 294 of FIG. 10 while step 318 is an example of step 296. In step 310, activity levels for each activity category specified in the activity packets received during the selected period are measured. Referring to the exemplary discussion of FIG. 7 above, the activity level for a particular activity category can be measured by summing corresponding flag values located in status table 230.

Using the measured activity levels, a combined weighted activity value is calculated (step 312). A power state that corresponds to the combined weighted activity value is identified as a first power state (step 314). Referring to the exemplary discussion of FIG. 9 above, the power state corresponding to a combined weighted activity value can be identified by identifying a largest combined threshold value in combined threshold table 282 that is met or exceeded by the combined weighted activity value. A corresponding combined threshold value, in this case, is a combined threshold value contained in field 288 of an entry 284.

A second power state is identified (step 316). The second power state is the most active of the power states specified for the activity packets received from priority clients during the selected period. Referring to the exemplary discussion of FIG. 8 above, activity packets can be identified as having been received from a priority client by referring to override table 252. Power states specified for a given priority client can then be identified by comparing an activity packet received from a priority client with that priority client's entry 268 in override table 252. The most active specified power state is identified as the second power state. Finally, the most active of the first and second power states is then selected (step 318).

CONCLUSION: The printing environment 100 shown in FIG. 1 is an exemplary environment in which embodiments of the present invention may be implemented. Implementation, however, is not limited to this environment or to a printing environment. While printers are used in the examples of FIGS. 1-10, each printer can be substituted with a peripheral of any type whose power state can be adjusted. As such, the following claims use the term peripheral to encompass printers and any other such peripherals whose power states can be adjusted in the manners described above.

The diagrams of FIGS. 2-5 show the architecture, functionality, and operation of various embodiments. Various components illustrated in FIGS. 2-5 are defined at least in part as programs. Each such component or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

FIGS. 6-8 illustrate exemplary data structures for use implementing various embodiments. However, these data structures are just that—exemplary. Although the flow diagrams of FIGS. 10-12 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method for managing a power state for a peripheral, comprising:
   listening for activity packets communicated from one or more of a plurality of clients configured to utilize the peripheral;
   examining activity packets received from two or more of the plurality of clients during a selected period, each received activity packet including activity data representative of a likelihood that one of the plurality of clients will utilize the peripheral,
   selecting a power state according to the examination of the activity packets received during the selected period;
   causing the peripheral to enter the selected power state.

2. The method of claim 1, wherein the activity data of an activity packet includes an activity data for each of a plurality of activity categories, and wherein:
   examining comprises measuring an activity level for each activity category of the received activity packets and identifying a power state corresponding to each measured activity level; and
   selecting comprises selecting the most active of the identified power states.

3. The method of claim 2, wherein the activity data for each activity category includes an activity flag and wherein measuring an activity level for each activity category comprises summing the activity flags from the received activity packets for that activity category and identifying a power state corresponding to the summed value.

4. The method of claim 2, wherein identifying a power state corresponding to a measured activity level comprises locating, in a look up table, data corresponding to the measured activity level for the activity category, the located data representing the power state corresponding to the measured activity level.

5. The method of claim 1, wherein the activity data of each activity packet includes activity data for each of a plurality of activity categories and at least one activity packet received during the selected time period was received from a priority client, and wherein:
  examining comprises:
    measuring an activity level for each activity category of the received activity packets;
    identifying a power state corresponding to each measured activity level; and
    identifying as a first power state, a most active of the power states corresponding to each measured activity level; and
    identifying as a second power state, a most active power state specified for an activity packet received from a priority client; and
  selecting comprises selecting the most active of the first and second power states.

6. The method of claim 5, wherein:
  identifying a power state corresponding to a measured activity level comprises locating, in a first look up table, first data corresponding to the measured activity level for the activity category, the first data representing the power state corresponding to the measured activity level; and
  identifying as a second power state comprises:
    examining the activity packet received from the priority client to identify in which of the activity categories the priority client is active;
    locating in a second look up table second data specifying power states for the priority client for each of the activity categories for which the priority client is active; and
    identifying as the second power state the most active of the power states specified by the second data.

7. The method of claim 1, wherein the activity data of each activity packet includes activity data for each of a plurality of activity categories and at least one activity packet received during the selected time period was received from a priority client, and wherein:
  examining comprises:
    measuring an activity level for each activity category of the received activity packets; and
    calculating a combined weighted activity value; and
  selecting comprises selecting a power state corresponding to the combined weighted activity value.

8. A computer readable storage medium having computer executable instructions for:
  listening for activity packets communicated from one or more of a plurality of clients configured to utilize a peripheral;
  examining activity packets received from two or more of the plurality of clients during a selected period, each received activity packet including activity data representative of a likelihood that one of the plurality of clients will utilize the peripheral,
  selecting a power state according to the examination of the activity packets received during the selected period;
  causing the peripheral to enter the selected power state.

9. The medium of claim 8, wherein the activity data of an activity packet includes an activity data for each of a plurality of activity categories, and wherein:
  the instructions for examining include instructions for measuring an activity level for each activity category of the received activity packets and identifying a power state corresponding to each measured activity level; and
  the instructions for selecting include instructions for selecting the most active of the identified power states.

10. The medium of claim 9, wherein the activity data for each activity category includes an activity flag and wherein the instructions for measuring an activity level for each activity category include instructions for summing the activity flags from the received activity packets for that activity category and identifying a power state corresponding to the summed value.

11. The medium of claim 9, wherein the instructions for identifying a power state corresponding to a measured activity level include instructions for locating, in a look up table, data corresponding to the measured activity level for the activity category, the located data representing the power state corresponding to the measured activity level.

12. The medium of claim 8, wherein the activity data of each activity packet includes activity data for each of a plurality of activity categories and at least one activity packet received during the selected time period was received from a priority client, and wherein:
  the instructions for examining include instructions for:
    measuring an activity level for each activity category of the received activity packets;
    identifying a power state corresponding to each measured activity level; and
    identifying as a first power state, a most active of the power states corresponding to each measured activity level; and
    identifying as a second power state, a most active power state specified for an activity packet received from a priority client; and
  the instructions for selecting include instructions for selecting the most active of the first and second power states.

13. The medium of claim 12, wherein:
  the instructions for identifying a power state corresponding to a measured activity level include instructions for locating, in a first look up table, first data corresponding to the measured activity level for the activity category, the first data representing the power state corresponding to the measured activity level; and
  the instructions for identifying as a second power state include instructions for:
    examining the activity packet received from the priority client to identify in which of the activity categories the priority client is active;
    locating in a second look up table second data specifying power states for the priority client for each of the activity categories for which the priority client is active; and
    identifying as the second power state the most active of the power states specified by the second data.

14. The medium of claim 8, wherein the activity data of each activity packet includes activity data for each of a plurality of activity categories and at least one activity packet received during the selected time period was received from a priority client, and wherein:
  the instructions for examining include instructions for:
    measuring an activity level for each activity category of the received activity packets; and
    calculating a combined weighted activity value; and
  the instructions for selecting include instructions for selecting a power state corresponding to the combined weighted activity value.

15. A system for managing a power state for a peripheral, comprising:
  an activity monitor operable to listen for activity packets communicated from one or more of a plurality of clients configured to utilize the peripheral;

an activity analyzer operable to examine activity packets received from two or more of the plurality of clients during a selected period, each received activity packet including activity data representative of a likelihood that one of the plurality of clients will utilize the peripheral, a power manager operable to select a power state according to the examination of the activity packets received during the selected period and to cause the peripheral to enter the selected power state.

16. The system of claim 15, wherein the activity data of an activity packet includes an activity data for each of a plurality of activity categories, and wherein:

the activity analyzer is operable to measure an activity level for each activity category of the received activity packets and identifying a power state corresponding to each measured activity level; and the power manager is operable to select the most active of the identified power states.

17. The system of claim 16, wherein the activity data for each activity category includes an activity flag and wherein the activity analyzer is operable to measure an activity level for each activity category by summing the activity flags from the received activity packets for that activity category and identifying a power state corresponding to the summed value.

18. The system of claim 16, wherein the activity analyzer is operable to identify a power state corresponding to a measured activity level by locating, in a look up table, data corresponding to the measured activity level for the activity category, the located data representing the power state corresponding to the measured activity level.

19. The system of claim 15, wherein the activity data of each activity packet includes activity data for each of a plurality of activity categories and at least one activity packet received during the selected time period was received from a priority client, and wherein:

the activity analyzer is operable to:
measure an activity level for each activity category of the received activity packets;
identify a power state corresponding to each measured activity level;
identify as a first power state, a most active of the power states corresponding to each measured activity level; and
identify as a second power state, a most active power state specified for an activity packet received from a priority client; and the power manager is operable to select the most active of the first and second power states.

20. The system of claim 19, wherein:

the activity analyzer is operable to identify a power state corresponding to a measured activity level by locating, in a first look up table, first data corresponding to the measured activity level for the activity category, the first data representing the power state corresponding to the measured activity level; and the activity monitor is operable to identify as a second power state by:
examining the activity packet received from the priority client to identify in which of the activity categories the priority client is active;
locating in a second look up table second data specifying power states for the priority client for each of the activity categories for which the priority client is active; and
identifying as the second power state the most active of the power states specified by the second data.

21. The system of claim 15, wherein the activity data of each activity packet includes activity data for each of a plurality of activity categories and at least one activity packet received during the selected time period was received from a priority client, and wherein:

the activity analyzer is operable to:
measure an activity level for each activity category of the received activity packets; and
calculate a combined weighted activity value; and the power manager is operable to select a power state corresponding to the combined weighted activity value.

* * * * *